United States Patent [19]
Rossi et al.

[11] Patent Number: 5,672,820
[45] Date of Patent: Sep. 30, 1997

[54] OBJECT LOCATION IDENTIFICATION SYSTEM FOR PROVIDING LOCATION DATA OF AN OBJECT BEING POINTED AT BY A POINTING DEVICE

[75] Inventors: John H. Rossi, Los Altos; Mark E. Innocenzi, Anaheim; Steven L. Goodfriend, Anaheim Hills; Douglas E. Lowe, Irvine, all of Calif.

[73] Assignee: Boeing North American, Inc., Seal Beach, Calif.

[21] Appl. No.: 642,071

[22] Filed: Apr. 30, 1996

Related U.S. Application Data

[63] Continuation-in-part of Ser. No. 442,273, May 16, 1995, abandoned.

[51] Int. Cl.$^6$ .............. G01C 21/00; G06G 7/78
[52] U.S. Cl. ............. 73/178 R; 364/449; 358/906; 348/116
[58] Field of Search ............. 358/909.1, 906; 348/207; 386/46; 354/105, 109, 75, 76

[56] References Cited

U.S. PATENT DOCUMENTS

| | | | |
|---|---|---|---|
| 4,084,184 | 4/1978 | Crain | 358/93 |
| 4,381,544 | 4/1983 | Stamm | 364/420 |
| 4,951,214 | 8/1990 | Hollister | 364/460 |
| 5,045,937 | 9/1991 | Myrick | 358/109 |
| 5,072,396 | 12/1991 | Fitzpatrick et al. | 364/450 |
| 5,124,915 | 6/1992 | Krenzel | 364/420 |
| 5,155,774 | 10/1992 | Numagami | 382/1 |
| 5,166,789 | 11/1992 | Myrick | 358/109 |
| 5,262,867 | 11/1993 | Kojima | 358/209 |
| 5,267,042 | 11/1993 | Tsuchiya et al. | 358/909.1 X |
| 5,335,072 | 8/1994 | Tanaka et al. | 348/232 |
| 5,367,333 | 11/1994 | Harriman | 348/117 |
| 5,373,318 | 12/1994 | Harriman | 348/117 |
| 5,381,338 | 1/1995 | Wysocki et al. | 364/449 |
| 5,574,649 | 11/1996 | Levy | 364/449 |

*Primary Examiner*—George M. Dombroske
*Assistant Examiner*—Paul D. Amrozowicz
*Attorney, Agent, or Firm*—Lawrence N. Ginsberg; Charles T. Silberberg

[57] ABSTRACT

The object location identification system includes a Receiving Module (RM), an Angular Measuring System (AMS) and a processor. The RM receives information specifying a user's location and provides RM output data in terms of latitude, longitude and altitude. The AMS is connectable to a pointing device for measuring the orientation of the pointing device and providing AMS output data in at least heading and depression angles. The processor processes the RM output data and the AMS output data and provides location data of an object being pointed at by the pointing device.

18 Claims, 5 Drawing Sheets

OBJECT LOCATION IDENTIFICATION SYSTEM FOR PROVIDING LOCATION DATA OF AN OBJECT BEING POINTED AT BY A POINTING DEVICE

This application is a continuation-in-part of application Ser. No. 08/442,273 filed on May 16, 1995, now abandoned.

BACKGROUND OF THE INVENTION

1. Field of the Invention

The present invention relates to object location identification systems, and more particularly to an object location identification system that estimates range and provides object location, latitude and altitude with a pointing device.

2. Description of the Related Art

During the Northridge, Calif. earthquake in January of 1993, TV news helicopters were providing remarkable video coverage over a wide area with high power magnification. Ground station personnel would frequently ask the airborne camera operator a simple and direct question: "Where is the location of the scene you are covering?" (or "What are we seeing?"). Often there would be no answer. A frequent reply was: "I don't know" or "I am not sure". In several incidents of high speed pursuit by the California Highway Patrol covered by TV news and police helicopters, the same problem arose in correlating the viewed scene with a precise location. Night video footage of fires in Malibu, Calif. was confused with footage of fire scenes in Laguna Beach, Calif., 40 miles away. Even high quality IR imageries of ground scenes (day or night) generally lack context information and need location information.

The need indicated by the above is for automatic map reference for real-time display of the camera view center pointed at a moving ground vehicle at a scene of interest. Prior approaches addressing this need have done so in a post-facto manner or with recording of the trajectory data from an on-board navigation computer, recording the scenes, and then, by manual intervention relating recognizable references in the scenes (such as road intersections or landmarks) to known map location coordinates. Such prior approaches to gather the data have depended upon radar measurements for altitude and/or range to object view center. Such implementations have been complex, costly, non real-time, and require large power sources for the radar and manual intervention for the post processing of imagery. The advantage for an automatic, real-time, portable, passive, low power, low cost, lightweight approach is clear.

U.S. Pat. No. 5,335,072, issued to Tanaka et at., discloses a photographic system, which stores information on photographed images. The system disclosed in the Tanaka system does not perform the function of real-time automatic view center location and display.

U.S. Pat. No. 4,381,544, issued to M. E. Stamm, discloses an active system for measuring physical characteristics of a measurement area for exploration. Similarly, the process and apparatus disclosed in the '544 patent does not perform the function of real-time automatic view center location and display.

U.S. Pat. No. 5,124,915, issued to A. Krenzel, discloses a data collection system for monitoring emergency situations. Similarly, this system suffers from the deficiencies noted above.

U.S. Pat. No. 5,155,774, issued to H. Nunagami, discloses an apparatus and method for verifying transformation coefficients to identify image location. It addresses the problem of correlating an image of an area to a map of the same general area using feature extraction and selected control points as referencing match points. It depends on using an imaging television camera and verifies the coefficients used in the equations to mesh, or morph, the two images.

U.S. Pat. No. 5,262,867 issued to K. Kojima, disclosed an electronic camera with sensing and data recording capability to allow reconstruction of a panoramic scene from individual images using azimuthal pointing for aligning individual images for ground-based imaging. It does not account for real-time camera view center tracking on a moving map display or real-time object location without a camera or sensor.

U.S. Pat. Nos. 5,166,789 and 5,045,937, issued to E. L Myrick, disclose systems for surveying using IR and Visible images and split screen viewing to allow for correlations of IR features with visible scene objects from an airborne platform. They involve pod mounted systems that look downward from the aircraft and require a radar altimeter for altitude measurement. The generalized location data associated with the scenes is that of the aircraft latitude and longitude. Obtaining an estimate of an object's location requires a direct overflight by the aircraft or separate image analysis step to reference the object's location relative to the aircraft's over-the-ground location.

SUMMARY OF THE INVENTION

The present invention is an object location identification system, which in its broadest aspect comprises a Receiving Module (RM), an Angular Measuring System (AMS) and a processor. The RM receives information specifying a user's location and provides RM output data in terms of latitude, longitude and altitude. The AMS is connectable to a pointing device for measuring the orientation of the pointing device and providing AMS output data in at least heading and depression angles. The processor processes the RM output data and the AMS output data and provides location data of an object being pointed at by the pointing device.

The present invention provides automatic, real-time map referencing capability with portable implementation. It can be joined to existing cameras, sensors, or pointing elements, or can be built in as an integral part of the system. From on board a helicopter, or other aircraft, pointing the sensor or pointing device at a moving ground object and maintaining the moving object in the view center or pointing notch, map movement of the object can be monitored and displayed (a capability currently needed in airborne TV news coverage and in airborne law enforcement). Pointing the sensor to distributed objects in the field of view from an aircraft or elevated platform, the current invention provides a low cost, battle management, fare management or crisis management capability without the need for expensive and dedicated, onboard equipment.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
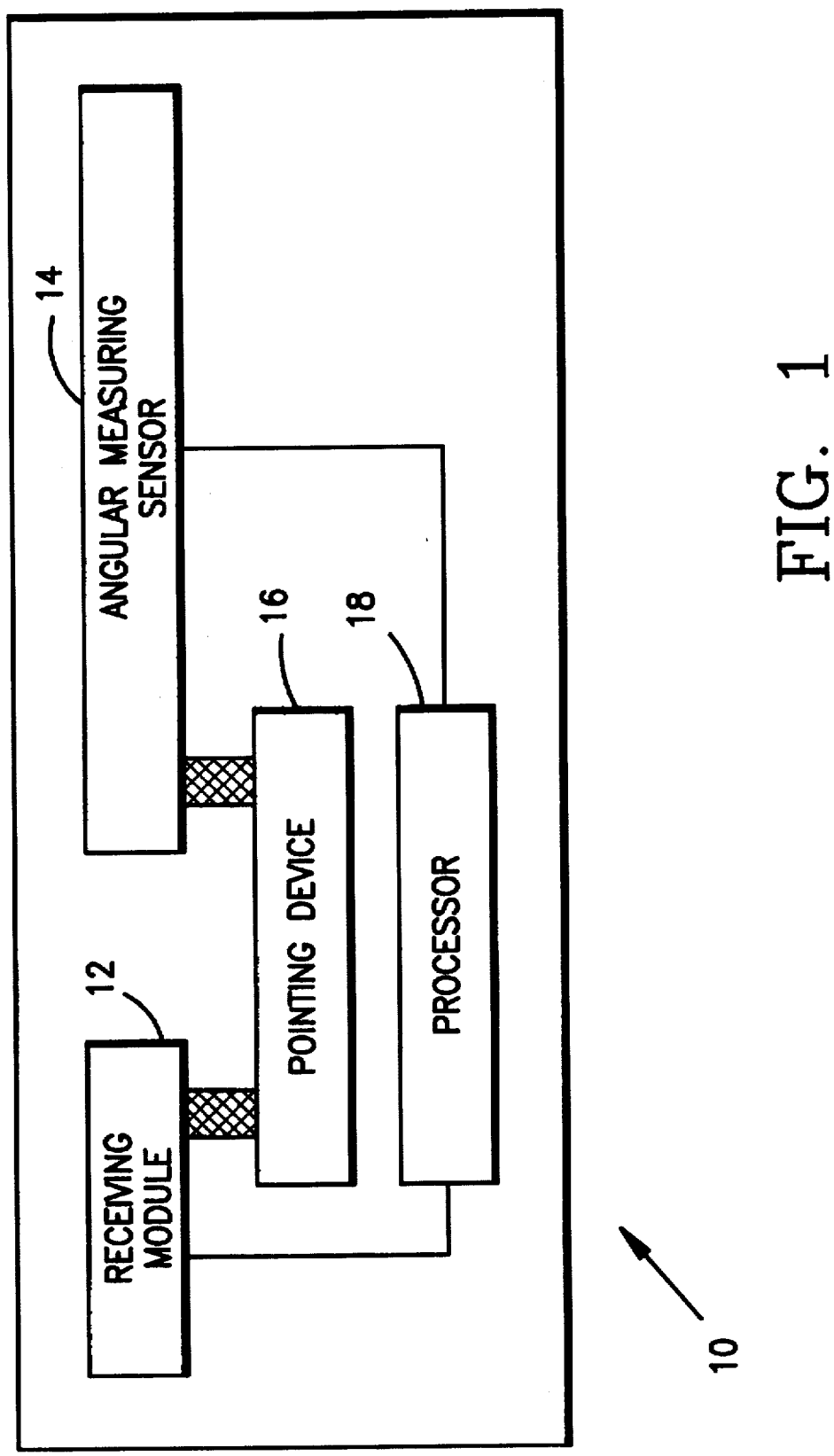
FIG. 1 is a schematic block diagram of the object location identification system of the present invention.

Referring now to the drawings and to the characters of reference marked thereon, FIG. 1 illustrates a schematic block diagram of the object location identification system of the present invention, designated generally as 10. System 10 includes a receiving module (RM) 12 for receiving information specifying a user's location and providing RM output data in terms of latitude, longitude and altitude. An angular measuring system (AMS) 14 is connectable to a pointing device 16 for measuring the orientation of the pointing device 16 and providing AMS output data in at least heading and depression angles. However, additional angular measurements could serve for correction comparisons. A processor 18 processes the RM output data and the AMS output data and provides location data of an object being pointed at by the pointing device 16.

Figure 2:
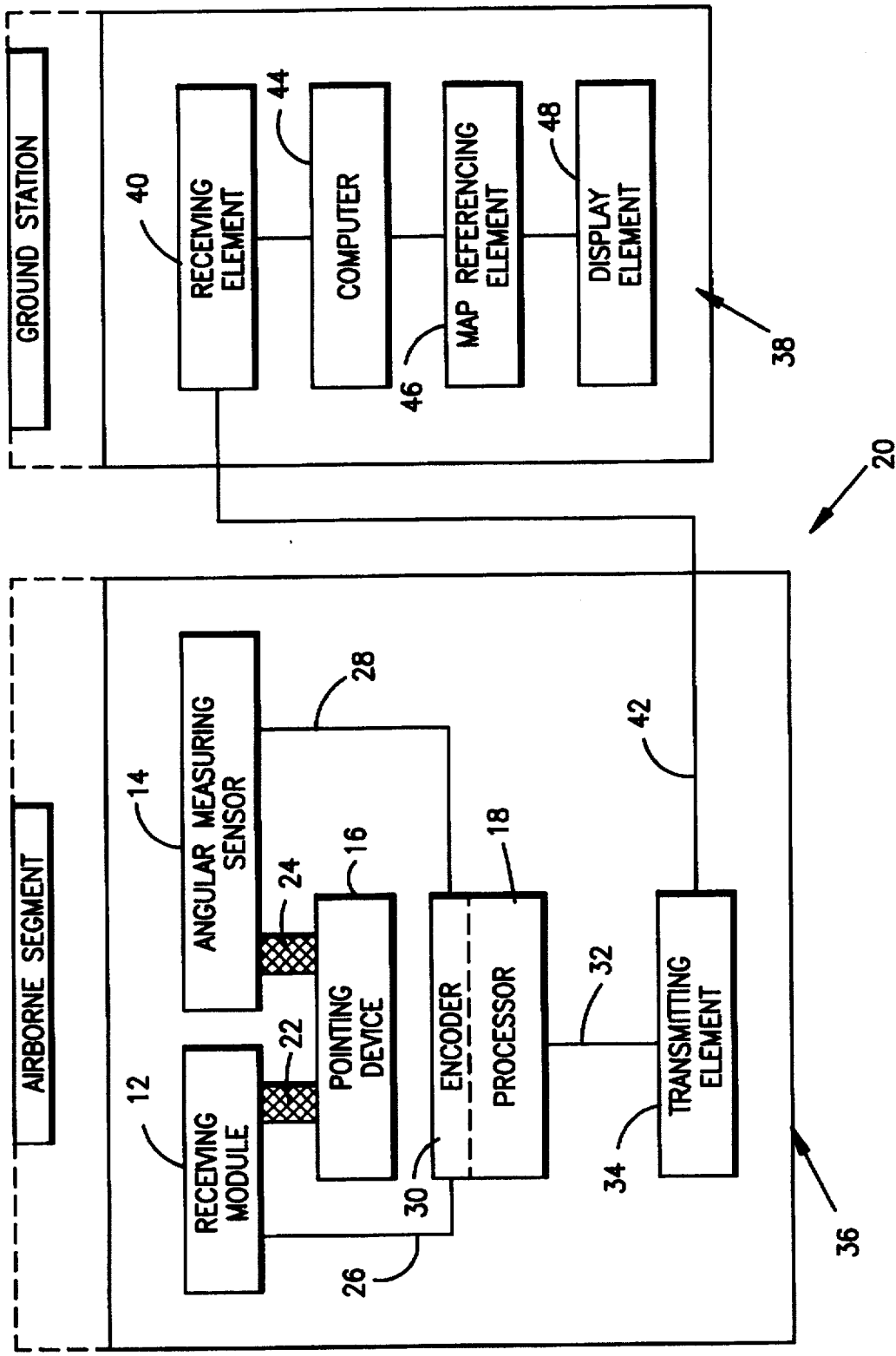
FIG. 2 is a block diagram of the present invention as utilized with ground-based processing.

Referring now to FIG. 2, a block diagram of the present invention is illustrated, showing utilization of the present invention with ground-based processing, such a system utilizing this ground-based processing being designated generally as 20. The receiving module 12 may include a global positioning system (GPS) receiver or a LORAN receiver. The GPS receiver may be of the differential type.

The AMS 14 may include an inertial measurement unit (IMU) such as the Digital Quartz Inertial (DQI) measurement unit manufactured and sold commercially by Rockwell International Corporation. Alternatively, the AMS may comprise an inertial navigation system (INS) having a IMU. The IMU may include micro machined rate sensors (MMRS). Such MMRS devices are often referred to as micro machined electronic sensors. The MMRS may comprise micro machined angular rate sensors (MMARS) and micro-machined accelerometers (MMA). The former devices (MMARS) are, for example, manufactured by Rockwell International Corporation and the latter devices (MMA) are available, for example, by the Charles S. Draper Laboratory. Such sensors are advantageous, because the size is on the order of the digits providing the date on a penny.

The pointing device 16 may include a video camera, an infrared (IR) camera, a multi-mode sensor, an active ranging element or a pointer stick. The RM and the AMS denoted by numeral designations 22, 24, are securely mounted to the pointing device 16. The processor 18 includes a computational element, such as a computer, for processing the RM output data 26 and the AMS output data 28. Such processing is via an encoding element 30. The encoder 30 combines RM output data 26 and AMS output data 28 of pointer location and angular orientation to act as input to the computational elements. These data are used as inputs to calculations, which compute the location of the object that is pointed to. The processor 18 may be, for example, a lap-top computer or processing chip. The output 32 from the processor 18 is input to a transmitting element 34. Transmitting element 34 may be, for example, an RF transmitter or a microwave transmitter. The location data being transmitted is in terms of latitude, longitude and altitude, of the object being pointed to.

The aforementioned elements of system 20 comprise the airborne segment thereof, designated generally as 36.

Referring now to the right side of FIG. 2, the ground station segment of system 20, is illustrated, designated generally as 38. A receiving element 40 receives the transmitted signal 42 from the transmitting element 34. Receiving element may be, for example, an RF receiver. The computer 44 accepts the latitude, longitude, and altitude of the airborne segment and the heading and depression angles of the pointing device. With these inputs, the computer applies algorithms to compute the location of the object being viewed. A map referencing element (MRE) 46 receives this location data and retrieves real-time graphic map displays associated with the object's specific location. The display element 48 referenced may be a screen display on a computer.

Computations in embodiment 20 are done on the ground. Map databases are part of the ground computer memory.

Figure 3:
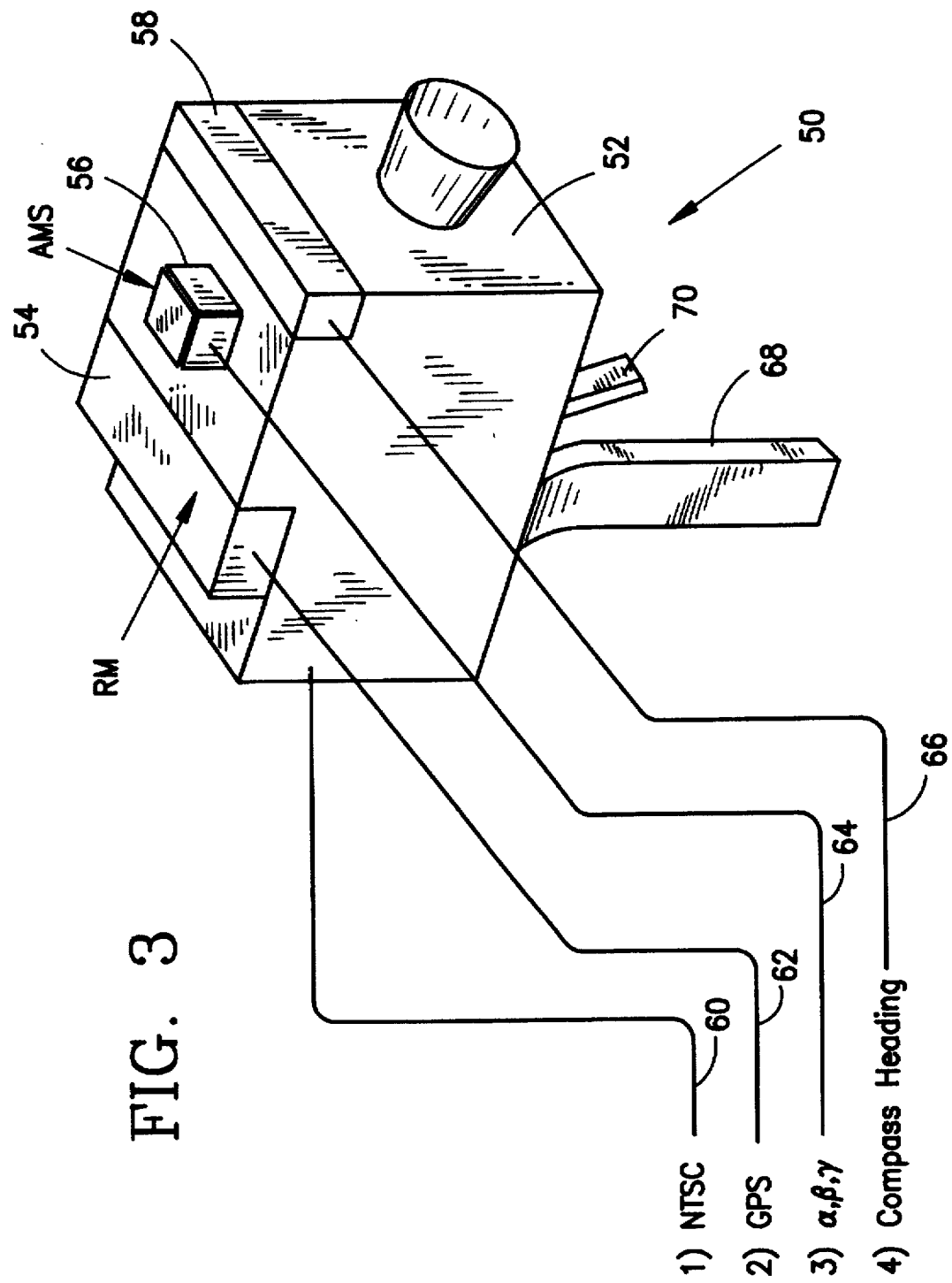
FIG. 3 is a perspective view of a preferred embodiment of the present invention.

Referring now to FIG. 3, an implementation of system 20 is illustrated, designated generally as 50. Implementation 50 includes a pointing device comprising a video camera 52. A receiving module comprising a GPS receiver 54 is hard-mounted to camera 52. Similarly, an AMS comprising a micro-machined rate sensor 56 is similarly hard-mounted to the video camera 52. A preferred AMS 56 measures three angles, $\alpha$, $\beta$, $\gamma$. A compass heading sensor 58 is also mounted to the video camera 52. Compass sensor 58 provides north referencing, which assists in the initial alignment. Lead 60 from the camera 52 is the video signal. Lead 62 from the receiver 54 provides the GPS coordinates of the camera in latitude, longitude and altitude. Lead 64 from the AMS 56 provides angular data regarding the orientation of the camera 52, as will be discussed in detail below. Lead 66 from the compass heading sensor 58 provides angular measurement from the north direction. A handle 68 and trigger 70 provide convenient handling and activation. Thus, the unit 50 provides convenient portable use in helicopter or fixed wing aircraft.

Figure 4:
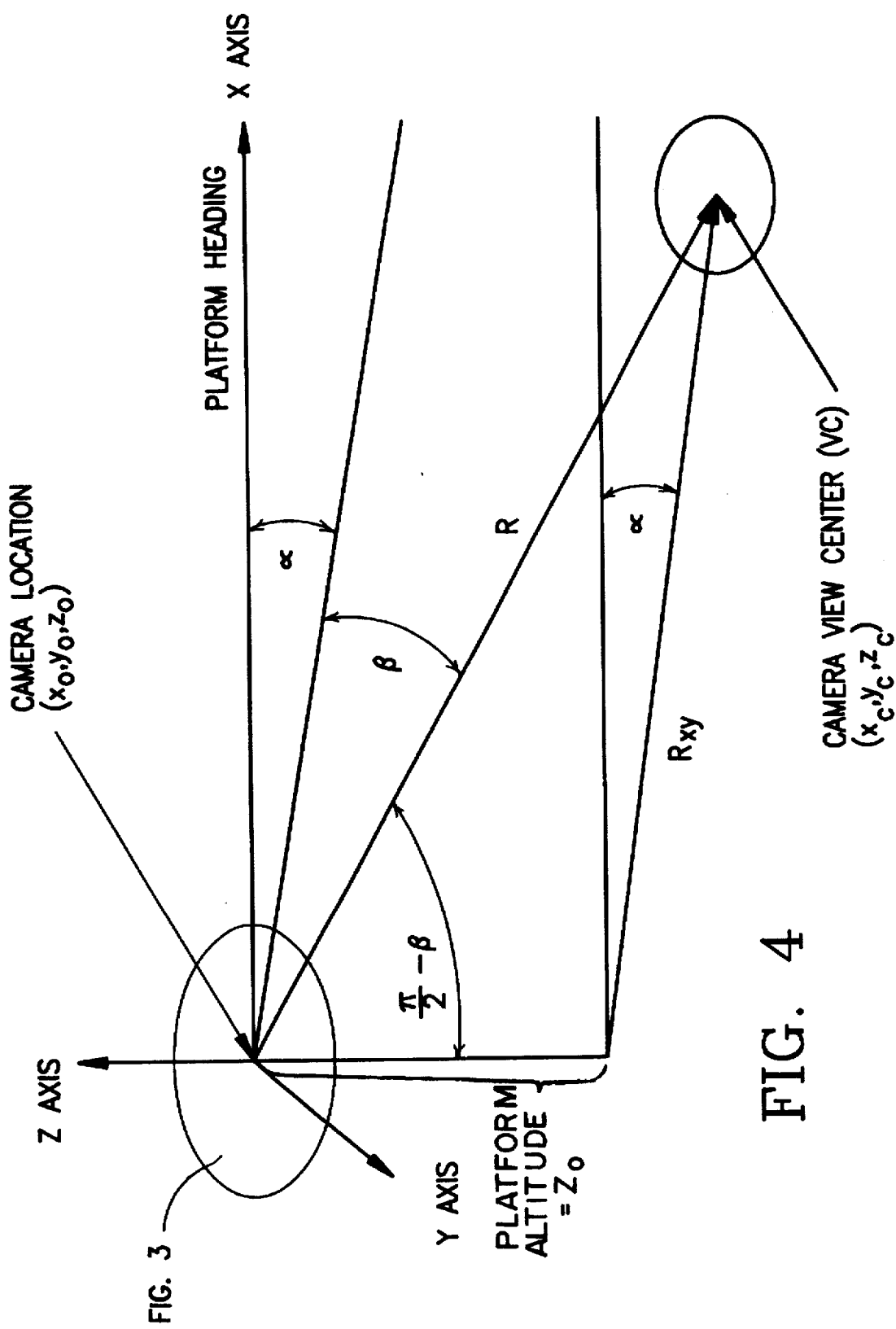
FIG. 4 is a geometric layout description of the operation of the present invention.

Referring now to FIG. 4, in operation, the unit 50 is transported, for example, in a helicopter, to an altitude $z_0$ and location coordinates $x_0$, $y_0$. The unit 50 is pointed, as shown by arrow R, to the object location VC (view center). Angles for making a viewpoint determination are indicated as $\alpha$ and $\beta$. ($\alpha$) is defined as the angle away from the platform heading (x-axis). ($\beta$) is the depression angle down from the plane formed by the x-axis and the y-axis. The other element needed for viewpoint determination is the range, R.

The range from the pointer to the viewed object, R, is calculated as follows to provide passive ranging from the pointing device to the object at the VC:

$$R = \frac{z_0}{\cos(\pi/2 - \beta)}$$

where $z_0$ is defined as the camera altitude.

R is used to compute the ground range projection $R_{xy}$, by the relationship:

$R_{xy} = (R^2 - z_0^2)^{1/2}$.

The View Center (VC) ($x_c$, $y_c$, $z_c$) is determined by the following relationships:

$x_c = x_0 + R_{xy} \cos\alpha$ $y_c = y_0 + R_{xy} \sin\alpha$, and $z_c$=TEMP, where TEMP is the adjusted altitude of the view center, such an adjustment being made to account for terrain elevation.

TEMP can be better understood as follows: For a flat earth model, TEMP would have the value of zero. For a non-flat earth model, TEMP is established via the elevation database associated with $x_c$ and $y_c$.

Example databases are provided by ETAK, Inc., Menlo Park, Calif. Other databases are provided by DeLorme, Mckeesport, Me.; or Government databases sold by the Defense Mapping Agency.

Figure 5:
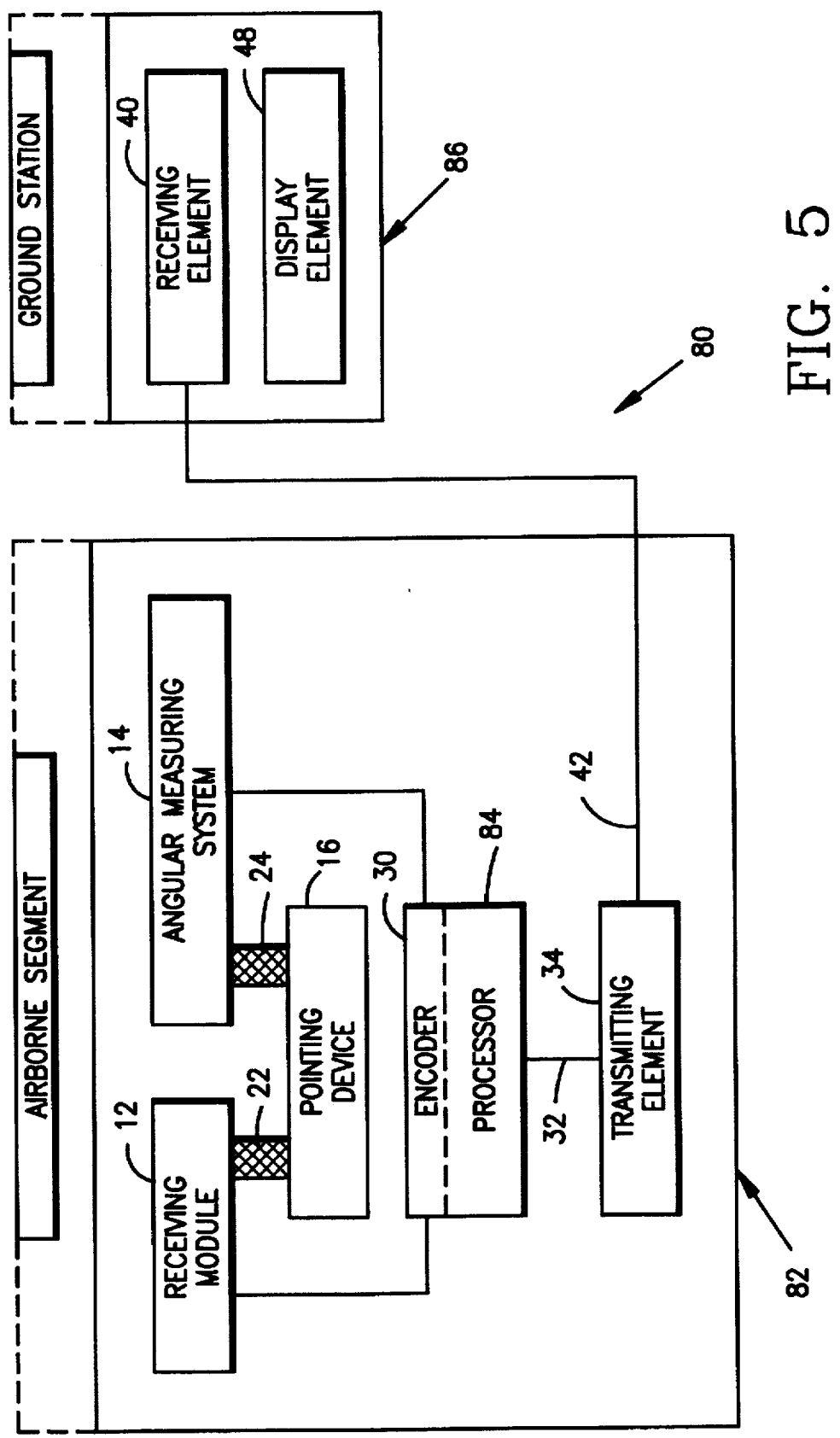
FIG. 5 is a block diagram of the present invention as utilized with airborne processing.

Referring now to FIG. 5, an alternate embodiment of the present invention is illustrated, designated generally as 80, in which most processing and map referencing is done in the airborne segment 82. The key difference in the embodiments is that the processing is done onboard the aircraft and the onboard capability includes the map reference database. These functions are implemented in processor 84. The ground station 86 of the present embodiment has simplified requirements to only display the summarized data from the on-board processor 84.

The present invention has numerous applications. Some potential commercial applications include: TV news media, entertainment; surveying (utilities, livestock, etc.); surveillance/map referencing; insurance claims; and court evidence.

Potential Government (non-military) applications include as follows: Law enforcement; search and rescue; fire management command and control; environmental spill monitoring; harbor monitoring; border patrol monitoring; real-time geodetic location; and drug enforcement surveillance and interdiction.

Some potential military applications may include: Target location; forward fire control; UAV applications; battle management command and control; bomb/disaster damage assessment; special operation forces (SOF); and terminal navigation and targeting.

Obviously, many modifications and variations of the present invention are possible in light of the above teachings. For example, the RM and AMS may comprise a single integrated unit such as an integrated INS/GPS unit known as C-MIGITS-II[198], which is manufactured and sold by Rockwell International Corporation. This provides hand-held portability. It is, therefore, to be understood that, within the scope of the appended claims, the invention may be practiced otherwise than as specifically described.

What is claimed and desired to be secured by Letters Patent of the United States is:

1. An object location identification system, comprising:
   a) a receiving module (RM) for receiving information specifying a user's location and providing RM output data in terms of latitude, longitude and altitude ($x_0$, $y_0$, $z_0$);
   b) an angular measuring system (AMS) securely mountable to a pointing device for measuring the orientation of said pointing device and providing AMS output data in at least heading and depression angles ($\alpha$, $\beta$) in real-time;
   c) a computational element for processing said RM output data and said AMS output data and providing location data of an object being pointed at by said pointing device, said location data being in terms of latitude, longitude and altitude; and
   d) a map referencing element (MRE) for receiving said location data and retrieving graphic map displays associated with the object's specific location,
   whereby the latitude and longitude of the pointing device are utilized as inputs to the map database to show the location of a field of view of the pointing device in real-time.

2. The object location identification system of claim 1, wherein said computation elements comprises an encoding element and a recording element for storage of said location data.

3. The object location identification system of claim 2, wherein said recording element comprises an image and data recorder with said location data being stored as an audio tone.

4. The object location identification system of claim 1, further including a pointing device.

5. The object location identification system of claim 4, wherein said pointing device comprises a video camera.

6. The object location identification system of claim 4, wherein said pointing device comprises an infrared (IR) camera.

7. The object location identification system of claim 4, wherein said pointing device comprises a multi-mode sensor.

8. The object location identification system of claim 1, wherein said AMS comprises an inertial navigation system (INS).

9. The object location identification system of claim 1, wherein said AMS comprises a micro-machined angular rate sensor (MMARS) and micro-machined accelerometer (MMA).

10. The object location identification system of claim 1, wherein said RM comprises a global positioning system (GPS) receiver.

11. The object location identification system of claim 1, wherein said system further includes:
   a) a transmitting element connected to said MRE for receiving a moving map display output of said MRE and for providing an RF signal; and
   b) a base station for receiving said RF signal, thereby providing remote readout and display of said moving map display output.

12. The object location identification system of claim 11, wherein said transmitting element is connected to said MRE via an encoding device.

13. The object location identification system of claim 1, wherein said system further includes:
   a) a transmitting element connectable to said RM and to said AMS for receiving said RM output data and said AMS output data and for providing an RF signal; and,
   b) a base station for receiving said RF signal for said processing by said computational element.

14. The object location identification system of claim 13, wherein said transmitting element is connectable to said RM and said AMS via an encoding device.

15. The object location identification system of claim 1, wherein said AMS comprises, solely, an inertial measurement unit (IMU), thus allowing for hand-held portability.

16. The object location identification system of claim 1, wherein said RM and said AMS comprise a single integrated unit.

17. An object location identification system adaptable for use with a pointing device, comprising:
   a) a receiving module (RM) for receiving information specifying a user's location and providing RM output data in terms of latitude, longitude and altitude ($x_0$, $y_0$, $z_0$);
   b) an angular measuring system (AMS) for providing AMS output data, indicative of the orientation of a pointing device, in at least heading and depression angles ($\alpha$, $\beta$) in real-time;
   c) a processor for processing said RM output data and said AMS output data and providing location data representing the location of an object relative to a pointing device; and
   d) a map referencing element (MRE) for receiving said location data and retrieving graphic map displays associated with the object's specific location, whereby the latitude and longitude of the pointing device are utilized as inputs to the map database to show the location of a field of view of the pointing device in real-time.

18. An object location identification system adaptable for use with a pointing device, comprising:

a) a receiving module (RM) for receiving information specifying a user's location and providing RM output data in terms of latitude, longitude and altitude ($x_o$, $y_o$, $z_o$);

b) an angular measuring system (AMS) for providing AMS output data, indicative of the orientation of a pointing device, in at least heading and depression angles ($\alpha$, $\beta$) in real-time;

c) a computational element for processing said RM output data and said AMS output data and providing location data representing the location of an object relative to a pointing device, said location data being in terms of latitude, longitude and altitude; and d) a map referencing element (MRE) for receiving said location data and retrieving graphic map displays associated with the object's specific location, whereby the latitude and longitude of the pointing device are utilized inputs to the map database to show the location of a field of view of the pointing device in real-time.

* * * * *